(12) United States Patent
Karsuntsev et al.

(10) Patent No.: US 11,842,000 B2
(45) Date of Patent: Dec. 12, 2023

(54) SENSOR SYSTEM

(71) Applicant: Wacom Co., Ltd., Saitama (JP)

(72) Inventors: Igor Karsuntsev, Saitama (JP);
Shigeyuki Sano, Kanagawa (JP);
Kenichi Ono, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/063,584

(22) Filed: Oct. 5, 2020

(65) Prior Publication Data

US 2021/0018992 A1 Jan. 21, 2021

Related U.S. Application Data

(63) Continuation of application No. 16/252,266, filed on Jan. 18, 2019, now Pat. No. 10,795,468.

(30) Foreign Application Priority Data

Feb. 1, 2018 (JP) ................................. 2018-016230

(51) Int. Cl.
*G06F 3/038* (2013.01)
*G06F 3/0354* (2013.01)
(Continued)

(52) U.S. Cl.
CPC ............ *G06F 3/0383* (2013.01); *G06F 1/169* (2013.01); *G06F 1/1616* (2013.01);
(Continued)

(58) Field of Classification Search
CPC ........... G06F 2203/04104; G06F 1/1641–1654
See application file for complete search history.

(56) References Cited

U.S. PATENT DOCUMENTS

| 8,866,840 | B2 | 10/2014 | Dahl et al. |
| 9,009,984 | B2 * | 4/2015 | Caskey ................. G06F 1/1677 |
| | | | 33/355 R |

(Continued)

FOREIGN PATENT DOCUMENTS

| JP | 2005-284499 A | 10/2005 |
| JP | 6235192 B2 | 11/2017 |

OTHER PUBLICATIONS

Japanese Office Action, dated Nov. 30, 2021, for Japanese Application No. 2018-016230, 6 pages. (with English Translation).

*Primary Examiner* — William Boddie
*Assistant Examiner* — Bipin Gyawali
(74) *Attorney, Agent, or Firm* — Seed IP Law Group LLP (57) ABSTRACT

A sensor system, which detects a stylus and is provided in an electronic apparatus, includes a first integrated circuit, a second integrated circuit, and an integrated circuit connection line that couples the first integrated circuit and the second integrated circuit to each other. The first integrated circuit is connected to a first sensor electrode group, and detects a position of the stylus on a panel face of a first housing. The second integrated circuit is connected to a second sensor electrode group, and detects a position of the stylus on a panel face of a second housing. When the first integrated circuit detects a presence of the stylus, a notification indicative of the detection is issued to the second integrated circuit through the integrated circuit connection line such that transmission of an uplink signal through the second sensor electrode group by the second integrated circuit is stopped.

22 Claims, 10 Drawing Sheets

(51) Int. Cl.
*G06F 3/041* (2006.01)
*G06F 1/16* (2006.01)
*G06F 3/044* (2006.01)

(52) U.S. Cl.
CPC ........ *G06F 1/1681* (2013.01); *G06F 3/03545* (2013.01); *G06F 3/0416* (2013.01); *G06F 3/044* (2013.01); *G06F 2203/04104* (2013.01)

(56) References Cited

U.S. PATENT DOCUMENTS

| | | | |
|---|---|---|---|
| 9,495,024 B2 | 11/2016 | Watanabe | |
| 10,055,036 B2 | 8/2018 | Koike et al. | |
| 10,228,780 B2 | 3/2019 | Kremin et al. | |
| 10,716,104 B2 | 7/2020 | Huang | |
| 11,073,945 B1* | 7/2021 | Pundak | G06F 1/1647 |
| 2005/0248541 A1 | 11/2005 | Chikami | |
| 2007/0123078 A1* | 5/2007 | Yada | H04M 1/0216 |
| | | | 439/164 |
| 2012/0068964 A1* | 3/2012 | Wright | G06F 3/0441 |
| | | | 345/174 |
| 2013/0100071 A1 | 4/2013 | Wright et al. | |
| 2013/0321340 A1* | 12/2013 | Seo | G06F 3/04883 |
| | | | 345/174 |
| 2014/0132554 A1* | 5/2014 | Sakabe | G06F 3/04166 |
| | | | 345/174 |
| 2014/0157125 A1* | 6/2014 | Seo | G06F 1/1616 |
| | | | 715/716 |
| 2014/0294306 A1* | 10/2014 | Fujita | G06V 30/1423 |
| | | | 382/187 |
| 2015/0116256 A1 | 4/2015 | Hsu et al. | |
| 2016/0231854 A1* | 8/2016 | Koo | G06F 3/047 |
| 2017/0153763 A1 | 6/2017 | Vavra et al. | |
| 2017/0357473 A1* | 12/2017 | Kim | G06F 1/1681 |
| 2018/0113519 A1 | 4/2018 | Yamamoto | |
| 2019/0102021 A1 | 4/2019 | Jang et al. | |
| 2019/0138068 A1* | 5/2019 | Park | G06F 1/163 |
| 2019/0227657 A1* | 7/2019 | Shimizu | G06F 3/045 |
| 2022/0129147 A1* | 4/2022 | Slassi | G06F 3/0416 |
| 2022/0365620 A1* | 11/2022 | Pundak | G06N 3/044 |

* cited by examiner

SENSOR SYSTEM

BACKGROUND

Technical Field

The present disclosure relates to a sensor system, and particularly to a sensor system that detects a stylus.

Background Art

As a sensor system for detecting a stylus, a sensor system is known in which an uplink signal is transmitted through capacitive coupling between a sensor electrode group provided on a panel and a stylus and a downlink signal transmitted from the stylus by which the uplink signal is detected is detected. Such a sensor system as just described is disclosed, for example, in Japanese Patent No. 6235192 (hereinafter, Patent Document 1).

An uplink signal transmitted from a sensor to a stylus utilizing an electrode group provided on a panel frequently has a long signal reach distance in comparison with a downlink signal that is a signal transmitted from the stylus to the sensor. In the case where it is tried to configure an electronic apparatus that utilizes a plurality of panels each including a sensor that uses an uplink signal having asymmetry in signal reach distance in this manner to allow position inputting with a stylus from the plurality of panels, uplink signals from the plurality of panels sometimes arrive at the single stylus. Therefore, there is a problem that, when the stylus tries to transmit a downlink signal on the basis of the timing or the substance of a command of an uplink signal transmitted from the electrode group, the stylus cannot discriminate to which one of the panels the electrode group from which the uplink signal is transmitted belongs.

On the other hand, if it is tried to provide an electrode group on each of a plurality of panels and connect the electrode groups to a single integrated circuit to perform detection, then there is the possibility that it may be possible to solve the problem described above. However, since it cannot be avoided to provide the integrated circuit on one of the panels, a large number of routing wires are connected to connection portions for connecting the panels. This gives rise to a different problem that, as opening and closing of the panels of the electronic apparatus are repeated, the possibility that disconnection may occur with some of the large number of routing wires increases.

BRIEF SUMMARY

According to a first aspect of the present disclosure, there is provided a sensor system that detects a stylus and is provided in an electronic apparatus, which includes a first housing, a second housing, a connector that connects the first housing and the second housing to each other, and a host processor. The sensor system includes a first sensor electrode group fixed to the first housing, and a second sensor electrode group fixed to the second housing. When the stylus is not detected, an uplink signal is transmitted through each of the first sensor electrode group and the second sensor electrode group. When a downlink signal by which the stylus is detected that is transmitted from the stylus is detected by the first sensor electrode group, the transmission of the uplink signal through the first sensor electrode group is continued while transmission of the uplink signal through the second sensor electrode group is stopped. When the downlink signal by which the stylus is detected that is transmitted from the stylus is detected by the second sensor electrode group, the transmission of the uplink signal through the second sensor electrode group is continued while transmission of the uplink signal through the first sensor electrode group is stopped.

According to the first aspect of the present disclosure, even if the first housing and the second housing are positioned closely to each other, such a situation can be prevented that the stylus detects an uplink signal transmitted through the first sensor electrode group, for example, while the stylus is being slidably moved on the panel face of the second housing or is under a hovering operation within a range of a hover reading height.

According to a second aspect of the present disclosure, there is provided the sensor system according to the first aspect, further including a first integrated circuit connected to the first sensor electrode group, wherein the first integrated circuit, in operation, detects a position of the stylus on a panel face of the first housing, a second integrated circuit connected to the second sensor electrode group, wherein the second integrated circuit, in operation, detects a position of the stylus on a panel face of the second housing, and an integrated circuit (IC) connection line that couples the first integrated circuit and the second integrated circuit to each other. When the first integrated circuit detects a presence of the stylus, a notification indicative of the detection is issued to the second integrated circuit through the IC connection line such that the transmission of the uplink signal using the second sensor electrode group by the second integrated circuit is stopped, the first integrated circuit is fixed to the first housing, the second integrated circuit is fixed to the second housing, the first sensor electrode group and the first integrated circuit are connected to each other by a first routing line provided inside of the first housing, the second sensor electrode group and the second integrated circuit are connected to each other by a second routing line provided inside of the second housing, and at least part of the IC connection line is provided in the connector.

According to the second aspect of the present disclosure, the electrodes of the first sensor electrode group or the second sensor electrode group can be disposed in a wider extent to an end portion of the panel face of the first housing or the second housing. Besides, in regard to the first routing line and the second routing line connected to a large number of electrodes, the probability of disconnection by curving or bending of the connection unit can be reduced, and therefore, the reliability of the sensor system can improved.

DETAILED DESCRIPTION OF THE PREFERRED EMBODIMENT

In the following, an embodiment of the present disclosure is described in detail with reference to the drawings.

Figure 1:
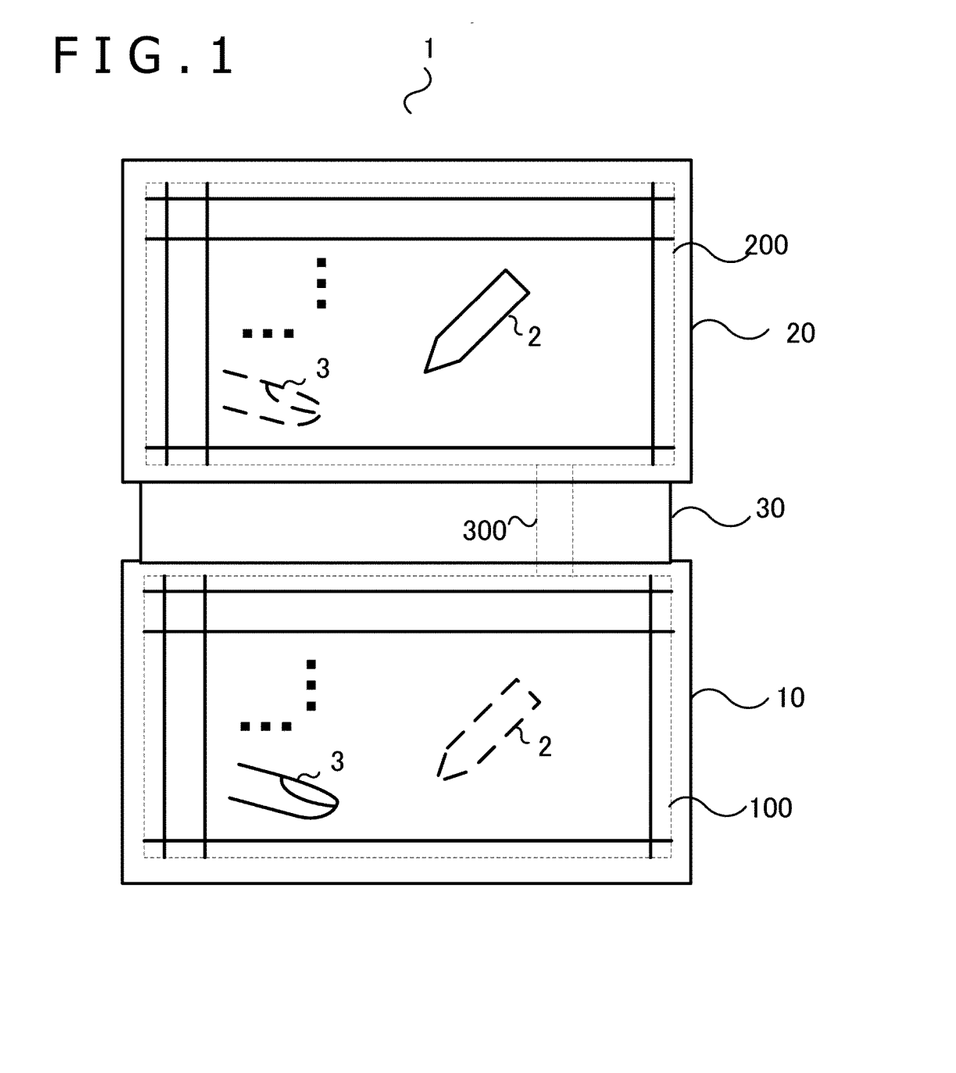
FIG. 1 is a schematic view of an electronic apparatus that includes a sensor system for detecting a stylus, according to an embodiment of the present disclosure.

FIG. 1 is a schematic view of an electronic apparatus 1 that includes a sensor system for detecting a stylus 2. As depicted in FIG. 1, the electronic apparatus 1 includes a first housing 10, a second housing 20 and a connection unit 30 as well as, though not depicted in FIG. 1, a host processor 40 and a sensor system 50 (refer to FIGS. 2 and 3).

Each of the first housing 10 and the second housing 20 includes a panel face on which the stylus 2 and a finger 3 are slidably moved. A first sensor electrode group 100 is fixed to the first housing 10, and a second sensor electrode group 200 is fixed to the second housing 20.

The connection unit 30 is a hinge that connects the second housing 20 to the first housing 10 such that the second housing 20 can pivot by 360 degrees with respect to the first housing 10. A flexible board 300 is provided in the connection unit 30. The flexible board 300 is deformed at an angle according to the pivotal motion of the second housing 20 with respect to the first housing 10.

The host processor 40 uses the sensor system 50 to accept an operation from the finger 3 or the stylus 2 and controls the entire electronic apparatus 1. The sensor system 50 is connected to the first sensor electrode group 100 and the second sensor electrode group 200, and detects the stylus 2 and the finger 3 and derives and outputs coordinates of the stylus 2 and the finger 3 to the host processor 40.

Figure 2:
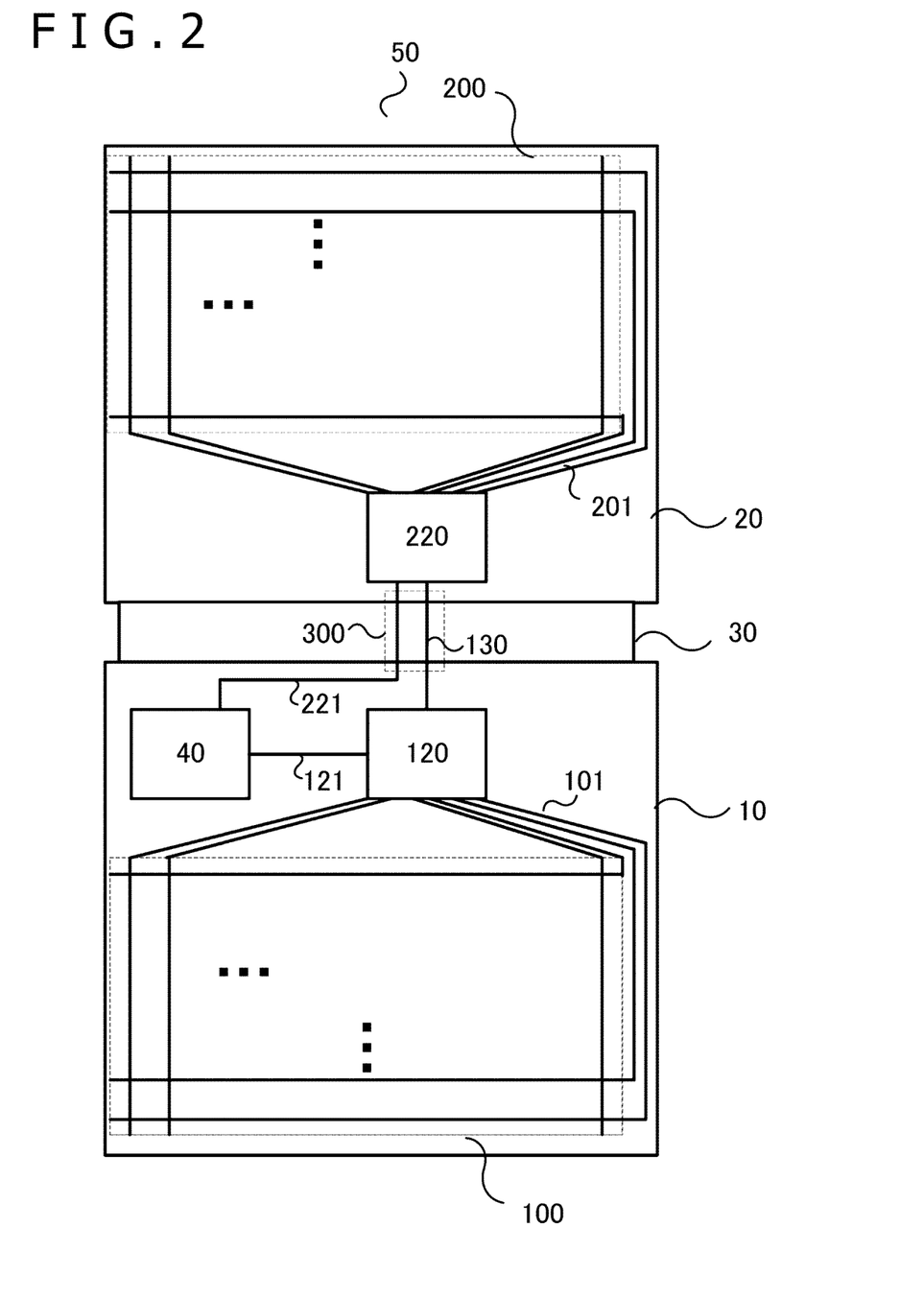
FIG. 2 is a conceptual view depicting an example of a sensor system, according to an embodiment of the present disclosure.

FIG. 2 is a conceptual view depicting the sensor system 50. Referring to FIG. 2, the sensor system 50 includes a first integrated circuit 120, a second integrated circuit 220 and an IC connection line 130.

The first integrated circuit 120 is connected to electrodes included in the first sensor electrode group 100 by first routing lines 101 provided so as to be accommodated in the inside of the first housing 10 and is connected to a first output line 121 serving as an interface to the host processor 40. The first integrated circuit 120 is further connected to the IC connection line 130 for transferring a signal to and from the second integrated circuit 220.

The second integrated circuit 220 is connected to electrodes included in the second sensor electrode group 200 by second routing lines 201 provided so as to be accommodated in the inside of the second housing 20 and is connected to a second output line 221 serving as an interface to the host processor 40. The second integrated circuit 220 is further connected to the IC connection line 130 for transferring a signal to and from the first integrated circuit 120.

The IC connection line 130 is a signal line for communicating a signal between the first integrated circuit 120 and the second integrated circuit 220. Different from the first routing lines 101 and the second routing lines 201, the IC connection line 130 is provided on the flexible board 300 that is deformed at least at part thereof by turning motion of the connection unit 30. Although the IC connection line 130 is depicted as a single wire in FIG. 2, it includes a plurality of signal lines necessary for the notification of a detection situation hereinafter described therebetween.

Figure 3:
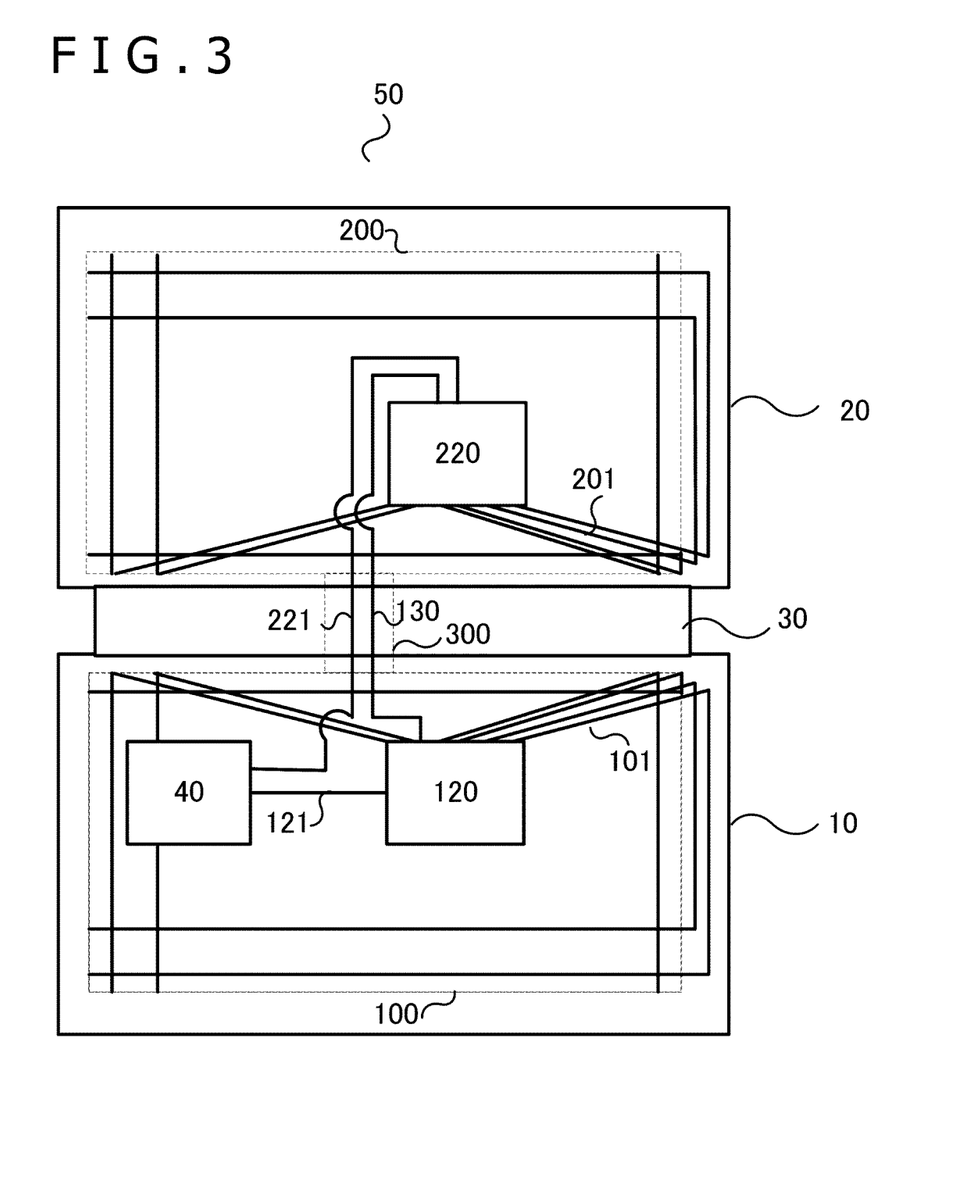
FIG. 3 is a conceptual view depicting another example of a sensor system, according to an embodiment of the present disclosure.

FIG. 3 is a conceptual view depicting a different example of the sensor system 50. According to the configuration of FIG. 3, the first routing lines 101 are curved or bent in the inside of the first housing 10 fixedly at an angle independent of the turning angle of the connection unit 30 and are terminated at the first integrated circuit 120. Similarly, the second routing wires are curved or bent in the inside of the second housing 20 fixedly at an angle independent of the turning angle of the connection unit 30 and are terminated at the second integrated circuit 220. The IC connection line 130 is curved or bent by turning motion of the hinge. Accordingly, the electrodes of the first sensor electrode group 100 or the second sensor electrode group 200 can be disposed in a wider extent to an end portion of the panel face of the first housing 10 or the second housing 20. Besides, in regard to the first routing lines 101 and the second routing lines 201 connected to a large number of electrodes, the probability of disconnection by curving or bending of the connection unit 30 can be reduced, and therefore, the reliability of the sensor system 50 can improved.

Now, operation of the sensor system 50 is described.

Figure 4:
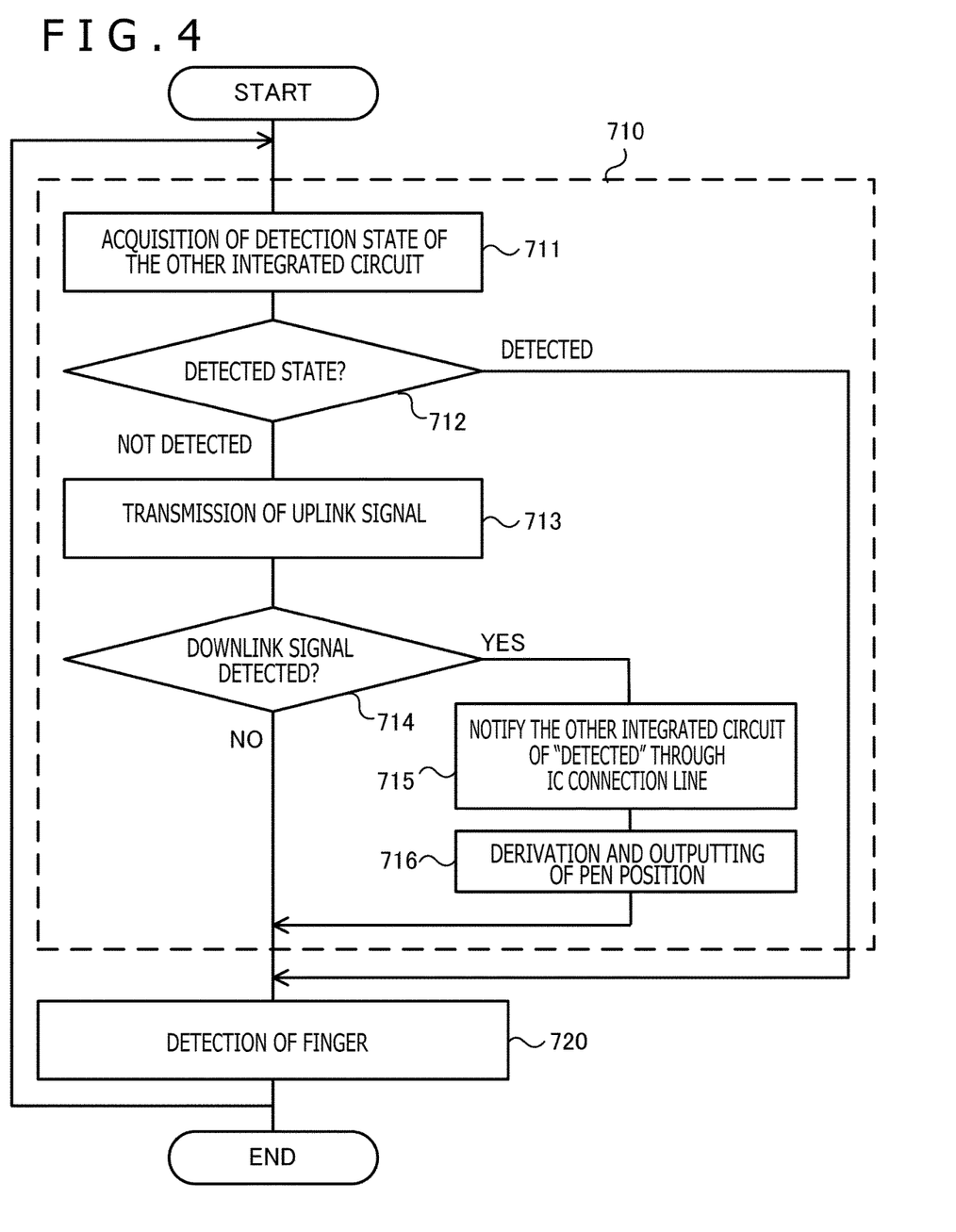
FIG. 4 is an operation flow chart of a first integrated circuit and a second integrated circuit, according to an embodiment of the present disclosure.

FIG. 4 is an operation flow chart of the first integrated circuit 120 and the second integrated circuit 220 included in the sensor system 50. Each of the first integrated circuit 120 and the second integrated circuit 220 transmits an uplink signal US (hereinafter described), detects a downlink signal DS transmitted from the stylus 2 by which the uplink signal US is detected, and outputs the position of the stylus 2 to the host processor 40 similarly to the sensor controller disclosed in Patent Document 1 mentioned hereinabove. Although the first integrated circuit 120 and the second integrated circuit 220 share a detection state of the stylus 2 through the IC connection line 130, position detection operations themselves of the stylus 2 or the finger 3 using the electrode groups of the first integrated circuit 120 and the second integrated circuit 220 such as transmission of an uplink signal US are performed independently of each other, namely, asynchronously. Since the first integrated circuit 120 and the second integrated circuit 220 perform independent operations in this manner, it is unnecessary, when the host processor 40 controls position detection control of the stylus 2 or the finger 3 by one of or both the first integrated circuit 120 and the second integrated circuit 220, to establish synchronism of a transmission timing of an uplink signal US or a control timing of the first integrated circuit 120 and the second integrated circuit 220 in coordinate detection or the like, and the independence of the first housing 10 and the second housing 20 can be maintained.

In the following, the operation flow of the first integrated circuit 120 and the second integrated circuit 220 is described with reference to FIG. 4 taking a scenario in which the finger 3 is slidably moved on the first housing 10 while the stylus 2 is operated to slidably move on the second housing 20 as an example.

Roughly, 710 indicated by a broken line frame indicates a pen detection process for detecting the stylus 2, and 720 indicates a finger detection process for detecting the finger 3. As depicted in FIG. 4, the first integrated circuit 120 and the second integrated circuit 220 time-divisionally perform the pen detection process and the finger detection process, respectively.

<Until Pen Down Operation is Performed after Pen Up Operation>

At 711, the first integrated circuit 120 and the second integrated circuit 220 individually acquire a detection state of the stylus 2 by the respective counterpart integrated circuits (second integrated circuit 220 to the first integrated circuit 120 and first integrated circuit 120 to the second integrated circuit 220). In the case where the detection state is not detected, namely, in the case where the result of decision at 712 is "not detected," the first integrated circuit 120 and the second integrated circuit 220 individually continue transmission of an uplink signal US at 713.

In the sensor system 50, since the first integrated circuit 120 and the second integrated circuit 220 individually perform the operations described above, in the case where the stylus 2 is not detected by any of the first integrated circuit 120 and the second integrated circuit 220, they individually transmit an uplink signal US through both the first sensor electrode group and the second sensor electrode group.

Figure 5:
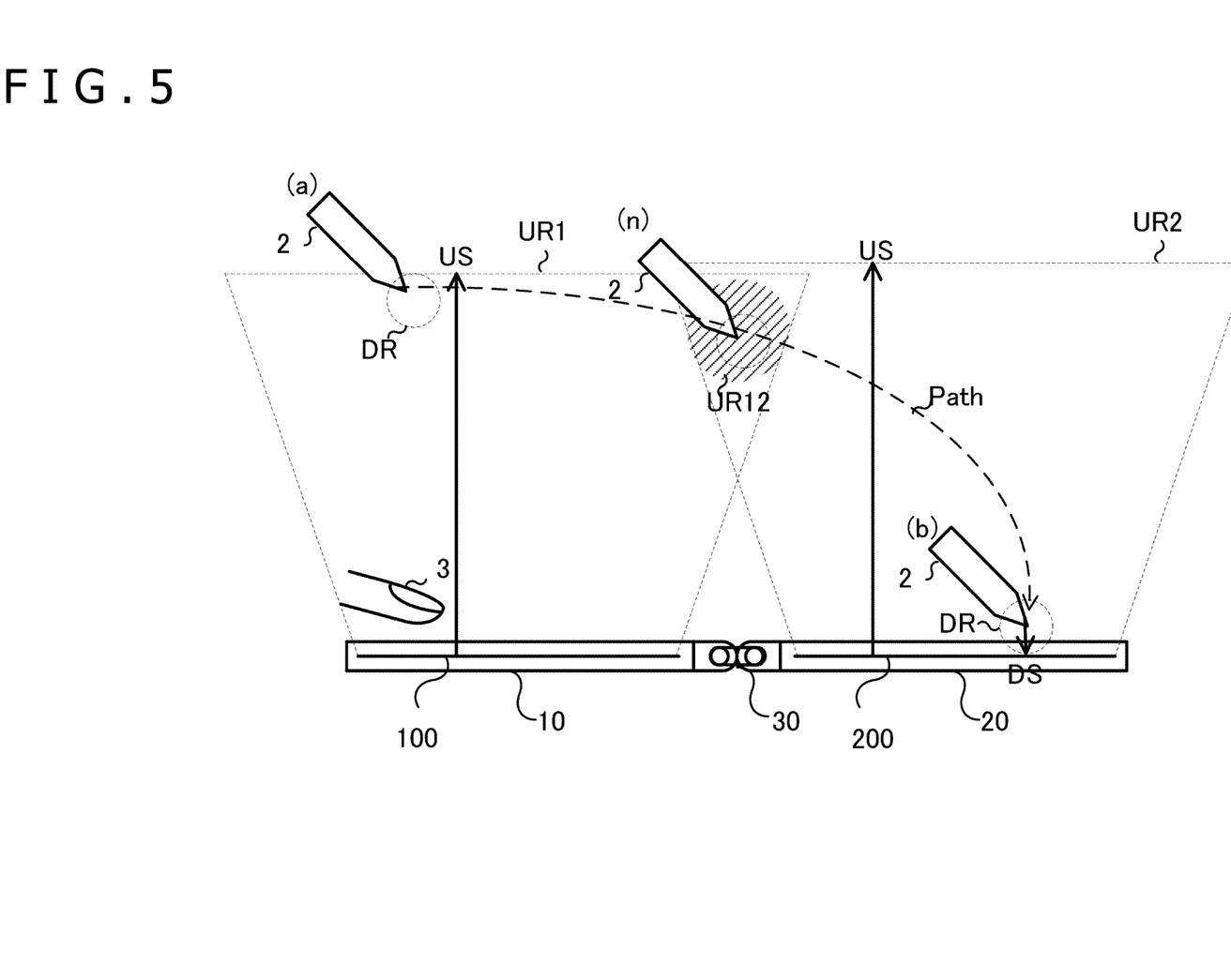
FIG. 5 is a view depicting a reach of an uplink signal transmitted from a sensor system in a state in which a first housing and a second housing define a first angle therebetween, according to an embodiment of the present disclosure.

FIG. 5 is a view depicting a reach of an uplink signal US transmitted by the sensor system 50 in a state in which the first housing 10 and the second housing 20 define a first angle therebetween. In FIG. 5, ranges UR1 and UR2 each modeled with a broken line trapezoidal frame indicate reaches of an uplink signal US transmitted from the first integrated circuit 120 and the second integrated circuit 220 through the first sensor electrode group 100 and the second sensor electrode group 200, respectively. The ranges depend upon the sensitivity with which the uplink signal US can be detected by a reception circuit provided in the inside of the stylus 2.

Further, a range DR modeled with a broken line circular frame is a reach of a downlink signal DS. The range that depends upon the sensitivity with which the first integrated circuit 120 or the second integrated circuit 220 can detect a signal transmitted from the stylus 2 through the first sensor electrode group 100 or the second sensor electrode group 200 is hereinafter referred to as hover reading height.

Here, the uplink signal US is transmitted using plural electrodes from among the plurality of electrodes from which the first sensor electrode group 100 or the second sensor electrode group 200 disposed so as to cover the panel face over an area as wide as possible is configured. In contrast, the downlink signal DS is transmitted from only one electrode provided at a distal end of the stylus 2. Accordingly, the detectable range of the uplink signal US is generally wide (high) in comparison with the hover reading height. In the case where a configuration example according to the method disclosed in Patent Document 1 or the like is used, the uplink signal US can be detected even at a height exceeding 10 cm. On the contrary, the hover reading height is generally within a range of several cm.

The stylus 2 existing at the position of (a) or (b) depicted in FIG. 5 can detect only one of uplink signals US from the first sensor electrode group 100 and the second sensor electrode group 200. However, in the case where the stylus 2 is positioned within a range UR12 indicated by slanting lines in FIG. 5, the circumstances are different. Since an uplink signal transmitted through the first sensor electrode group 100 and an uplink signal transmitted through the second sensor electrode group 200 have a same waveform and the stylus 2 can detect both uplink signals without distinction, there is the possibility that the stylus 2 may detect both the uplink signal US transmitted through the first sensor electrode group 100 and the uplink signal US transmitted through the second sensor electrode group 200. Consequently, even if the stylus 2 is under a pen down operation toward the panel face of the second housing 20 indicated by a broken line arrow mark Path in FIG. 5, there is the possibility that the reference time may be set to that from the first sensor electrode group 100 and may be synthesized with the first integrated circuit 120 unintentionally.

Figure 6:
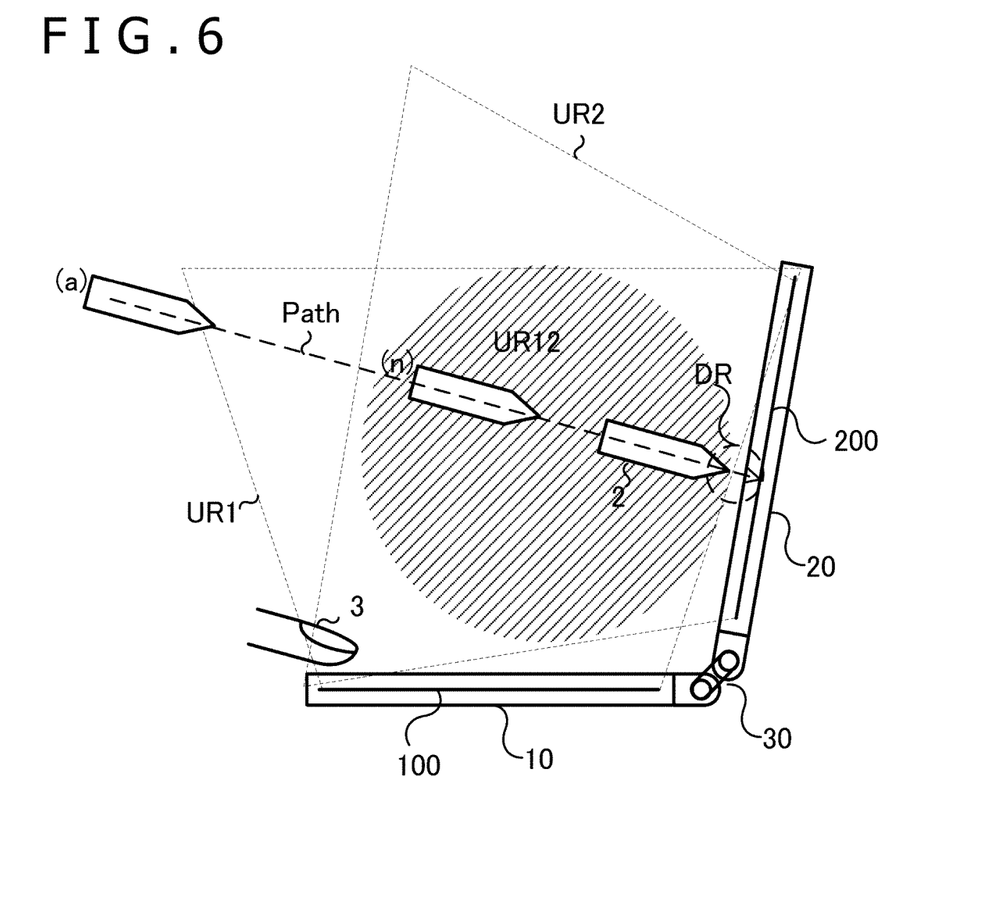
FIG. 6 is a view depicting a reach of an uplink signal transmitted from a sensor system in a state in which the first housing and the second housing define therebetween a second angle smaller than the first angle, according to an embodiment of the present disclosure.

FIG. 6 is a view depicting a reach of an uplink signal US transmitted from the sensor system 50 in a state in which the first housing 10 and the second housing 20 define therebetween a second angle smaller than the first angle. In this case, synchronism with the first integrated circuit 120 sometimes occurs with a higher probability than that in the case of FIG. 5.

Figure 7:
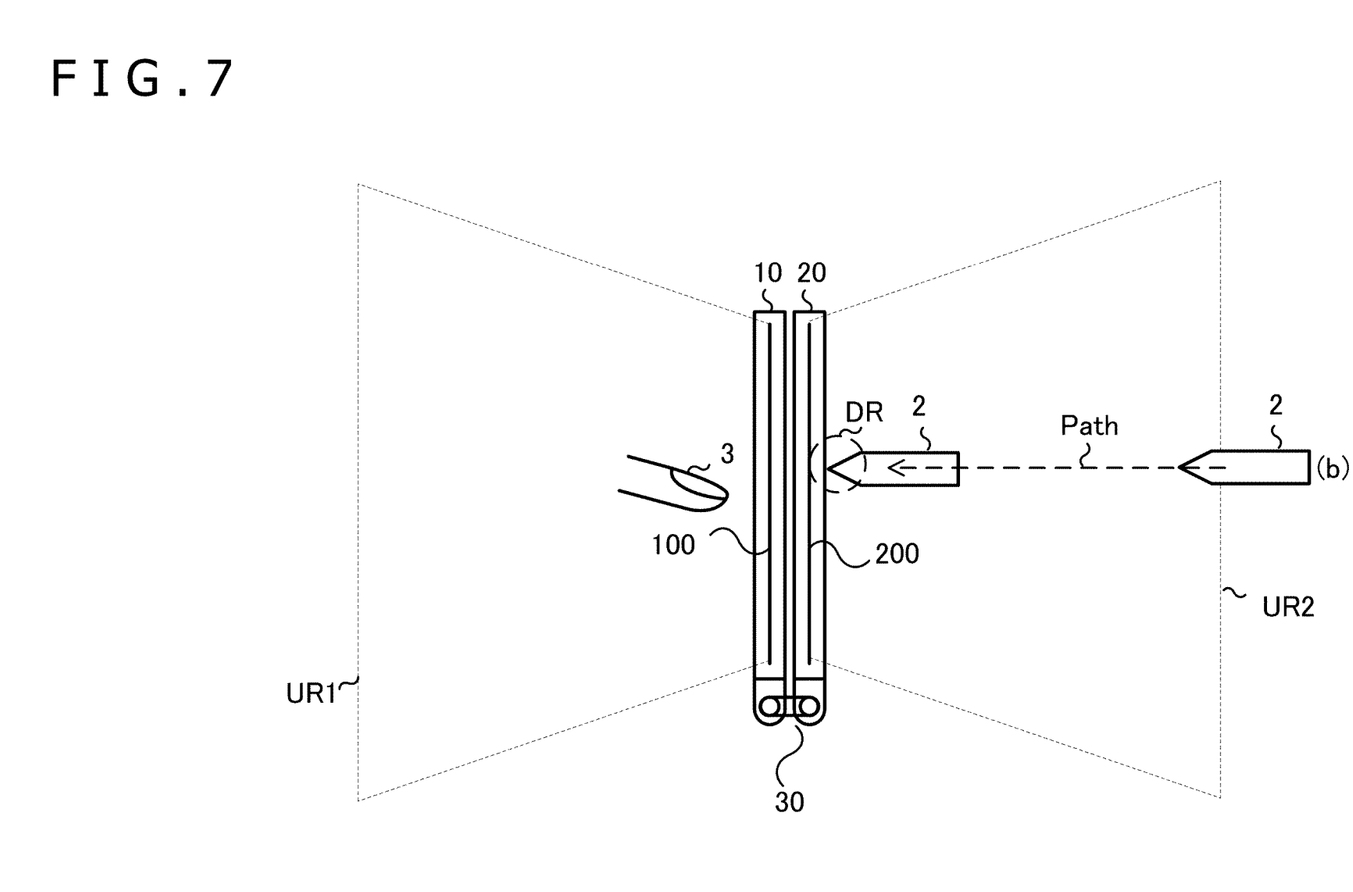
FIG. 7 is a view depicting a reach of an uplink signal transmitted from a sensor system in a further state in which the first housing and the second housing define therebetween a third angle smaller than the first angle, according to an embodiment of the present disclosure.

FIG. 7 is a view depicting a reach of an uplink signal US transmitted from the sensor system 50 in a state in which the first housing 10 and the second housing 20 define therebetween a third angle greater than the first angle. In this case, the range UR12 in which both an uplink signal US transmitted through the first sensor electrode group 100 and an uplink signal US transmitted through the second sensor electrode group 200 can be detected does not appear.

The extent of the range UR12 in which both the uplink signal US transmitted through the first sensor electrode group 100 and the uplink signal US transmitted through the second sensor electrode group 200 can be detected differs depending upon the angle defined by the first housing 10 and the second housing 20. Especially, if the angle defined by the panel face of the first housing 10 and the panel face of the second housing 20 becomes small like the angle of FIG. 6, then the range UR12 becomes great significantly, resulting in increase of the possibility that, although the stylus 2 is being slidably moved on the panel face of the first housing 10 or is under a hovering operation at the hover reading height, the stylus 2 may detect the uplink signal US from the first sensor electrode group 100.

Referring back to FIG. 4, it is assumed that, after the second integrated circuit 220 sends out the uplink signal US, it detects a downlink signal DS transmitted from the stylus 2 at 714. In other words, in the second integrated circuit 220, the decision at 714 is YES. On the other hand, it is assumed that the first integrated circuit 120 does not detect the downlink signal DS and the decision at 714 in the first integrated circuit 120 is NO. As a result, the first integrated circuit 120 does not perform 715 and 716 hereinafter described but performs the finger detection process (720) for detecting the finger 3 using a capacitance method, whereafter the processing returns to 711.

<Until Pen Up Operation is Performed after Pen Down Operation>

In a state in which the stylus 2 is held in the air without entering the hover reading height DR of any of the first integrated circuit 120 and the second integrated circuit 220, the downlink signal DS is not detected by the second integrated circuit 220 either, and the processes at the acts described above are repeated.

Thereafter, if the stylus 2 is moved toward the panel face of the second housing 20 as indicated by the locus Path by a pen down operation until it comes to the hover reading height DR by the second sensor electrode group 200, then the second integrated circuit 220 detects the downlink signal DS. In particular, the result of the decision at 714 now becomes YES.

Consequently, the second integrated circuit 220 issues a notification that it has "detected" the stylus 2 to the first integrated circuit 120. This notification is performed through the IC connection line 130, for example, by changing the voltage of one connection line of the plurality of IC connection lines 130 from Low to High. In response to the notification at 715 by the second integrated circuit 220, in the first integrated circuit 120 that is the other integrated circuit that operates independently but in the same operation flow, the result of the decision at 712 becomes "detected," and transmission of the uplink signal US is stopped.

Figure 8:
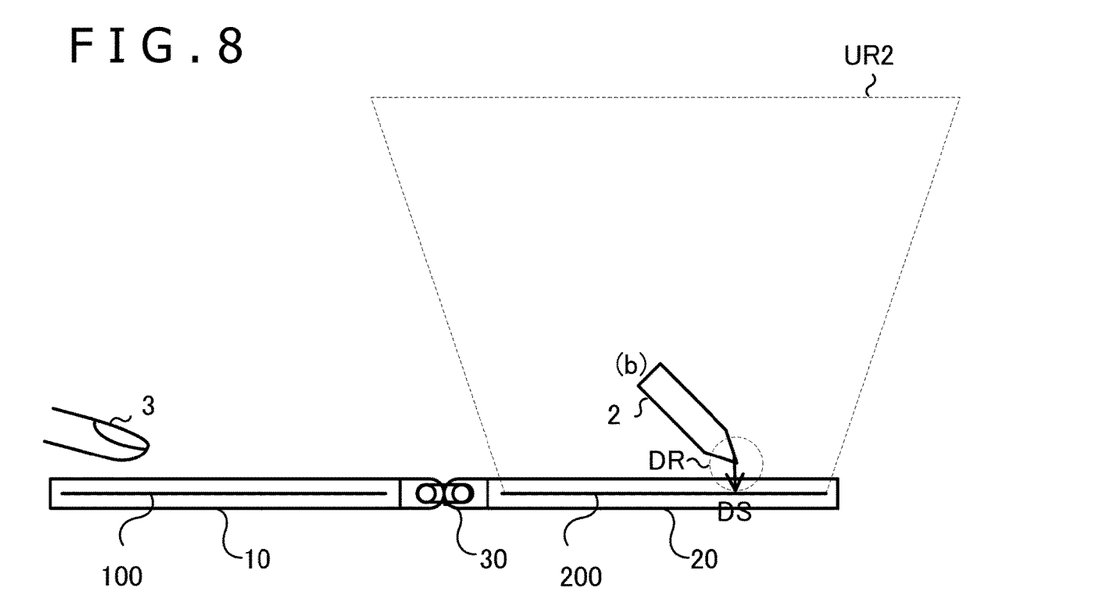
FIG. 8 is a view depicting a reach of an uplink signal transmitted from a sensor system after a stylus is detected by a second integrated circuit, according to an embodiment of the present disclosure.
Figure 9:
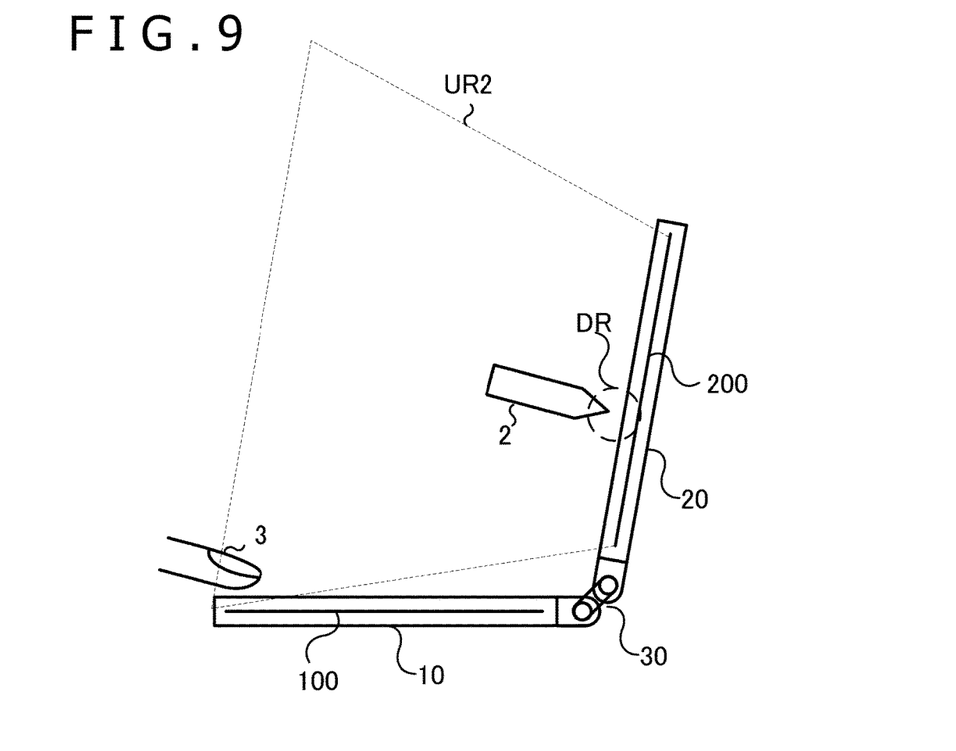
FIG. 9 is a view depicting another reach of an uplink signal transmitted from a sensor system after a stylus is detected by a second integrated circuit, according to an embodiment of the present disclosure.

FIG. 8 is a view corresponding to FIG. 5 and depicting a reach of an uplink signal US transmitted by the sensor system 50 after the stylus 2 is detected by the second integrated circuit 220. FIG. 9 is a view corresponding to FIG. 6.

Referring back to FIG. 4, the second integrated circuit 220 thereafter derives, at 716, the position of the stylus 2 on the basis of the detection level of the downlink signal DS at the electrodes included in the second sensor electrode group 200 and outputs the detected position of the stylus 2 to the host processor 40.

At 720, both the first integrated circuit 120 and the second integrated circuit 220 perform a finger detection process. The notification at 715 is repeated as long as the stylus 2 is slidably moved on the panel face of the second housing 20 and remains existing in the hover reading height DR with respect to the second sensor electrode group 200.

If the stylus 2 thereafter goes out from the hover reading height DR, then the notification at 715 by the second integrated circuit 220 is stopped and transmission of an uplink signal US by the first integrated circuit 120 is resumed.

In this manner, the sensor system 50 includes a first integrated circuit that is connected to the first sensor electrode group 100 and detects the position of the stylus 2 on the panel face of the first housing 10, a second integrated circuit 220 that is connected to the second sensor electrode group 200 and detects the position of the stylus 2 on the panel face of the second housing 20, and an IC connection line 130 that couples the first integrated circuit 120 and the second integrated circuit 220 to each other, and in the case where the second integrated circuit 220 detects the presence of the stylus 2, it issues a notification indicative of the detection to the first integrated circuit 120 through the IC connection line 130 such that transmission of an uplink signal US using the first sensor electrode group 100 by the first integrated circuit 120 is stopped.

Further, in the sensor system 50, when the downlink signal DS transmitted from the stylus 2 is not detected anymore after the transmission is stopped, transmission of an uplink signal US using the first sensor electrode group 100 that is the other sensor electrodes is resumed.

By the configuration described, especially even if the first housing 10 and the second housing 20 approach each other to such an angle as depicted in FIG. 6, while the stylus 2 is being slidably moved on the panel face of the second housing 20 or is under hovering operation within the range of the hover reading height, such a situation that the stylus 2 detects an uplink signal US transmitted through the first sensor electrode group 100 can be prevented.

<Modification>

Figure 10:
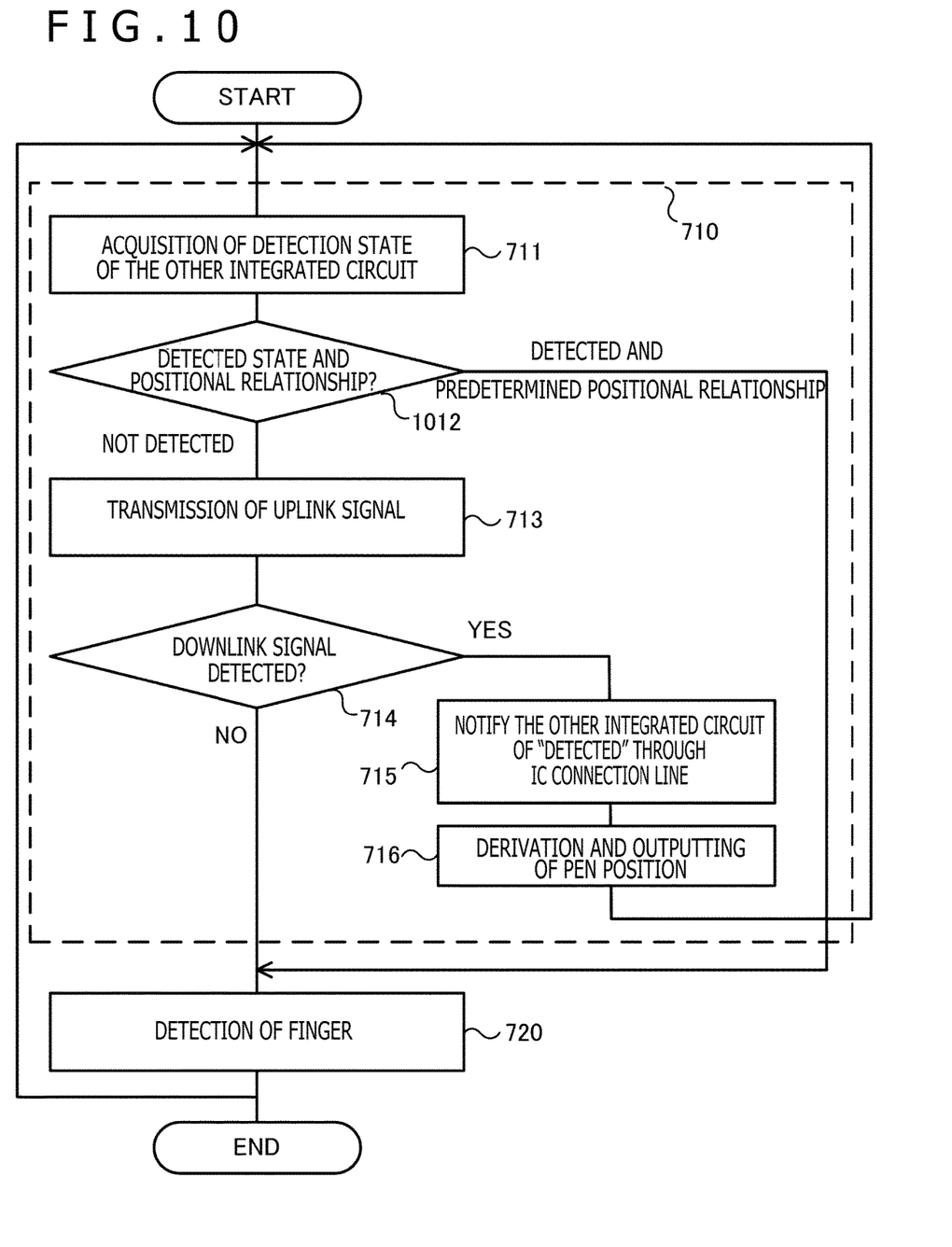
FIG. 10 is an operation flow chart of a first integrated circuit or a second integrated circuit according to an embodiment of the present disclosure.

FIG. 10 is an operation flow chart of the first integrated circuit 120 or the second integrated circuit 220 according to a modification. In the following, only differences of the operation flow from the operation flow of FIG. 4 are described.

First, in the modification, in place of the decision at 712 of FIG. 4 based on a detection state of the stylus 2 by the other integrated circuit, the positional relationship between the first housing 10 and the second housing 20 is adopted as a criterion together with the detection state of the stylus 2 by the other integrated circuit.

Consequently, for example, in such a case as the positional relationship depicted in FIG. 7 in which interference of an uplink signal US cannot occur, for example, even in the case where the stylus 2 is detected by the second integrated circuit 220, it is possible to continue transmission of an uplink signal US by the first integrated circuit 120. Accordingly, it is possible to execute operation for detecting the stylus 2 on both of the panel faces of the first housing 10 and the second housing 20, and the availability of the sensor system 50 can be enhanced.

Further, in the sensor system 50 according to the modification depicted in FIG. 10, the integrated circuit that has performed derivation and outputting of a pen position by a downlink signal at 716 does not perform the finger detection process (720) as depicted in FIG. 4 but continues the pen detection process (710) as depicted in FIG. 10. Further, in the case where one integrated circuit detects the stylus 2 at 1012 of FIG. 10, the other integrated circuit skips the pen detection process (710) and repeatedly performs only the finger detection process (720).

Figure 11:
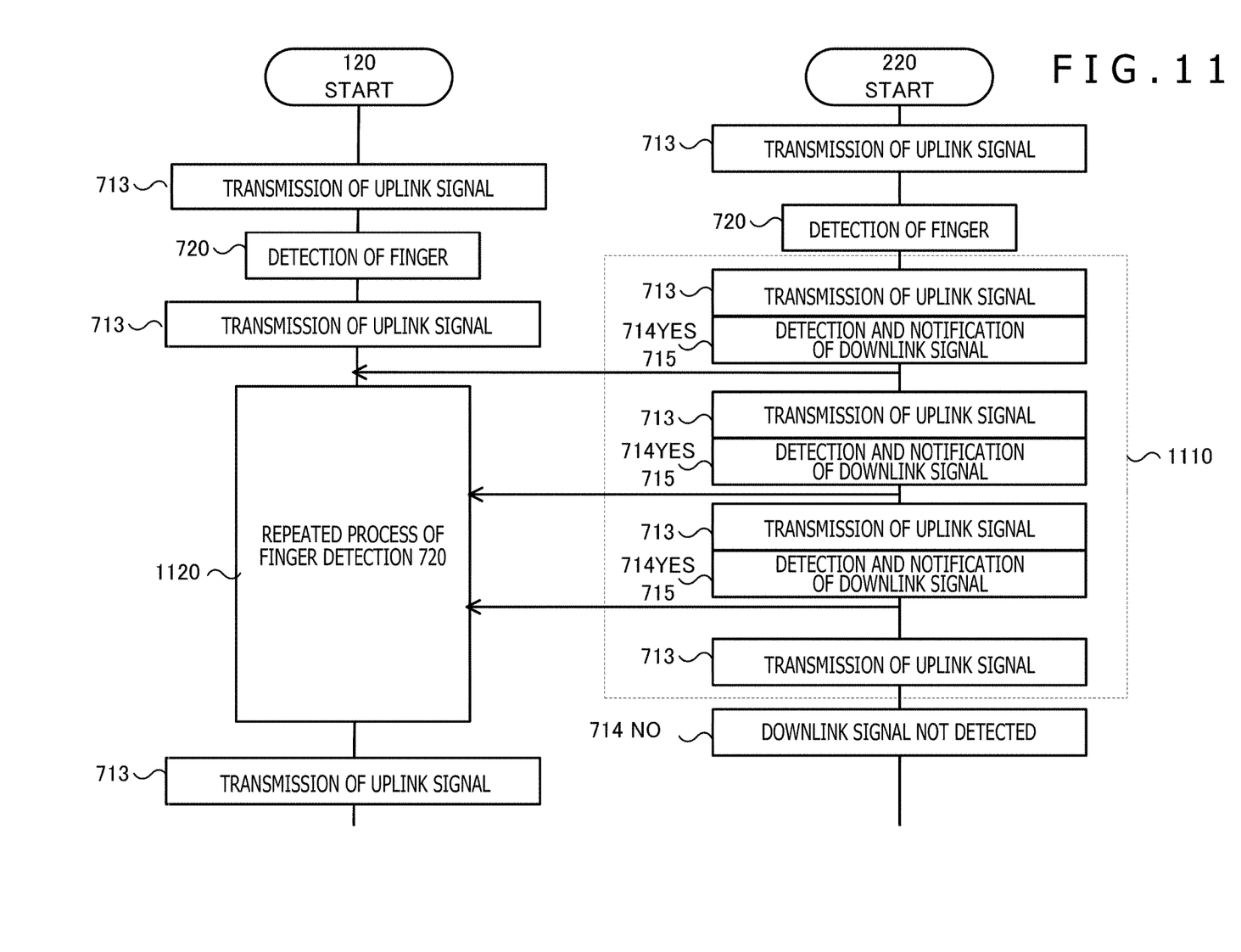
FIG. 11 is an operation flow chart illustrating operation of a sensor system according to an embodiment of the present disclosure.

FIG. 11 is an operation flow chart illustrating operation of the sensor system 50 according to the modification. FIG. 11 depicts an operation flow taking a case in which the second integrated circuit 220 detects the stylus 2 as an example.

If the second integrated circuit 220 detects a downlink signal DS at 714, then it notifies the first integrated circuit 120 of this (715).

While the notification continues to be received, the first integrated circuit 120 skips the pen detection process (710) and repeats only the finger detection process (720) for detecting the position of the finger 3 (1120).

On the other hand, the second integrated circuit 220 having detected the downlink signal DS of the stylus 2 skips the finger detection process (720) and repeats only the pen detection process (710) for detecting the stylus 2 (1110).

Where the sensor system 50 operates in such a manner as indicated by the operation flow depicted in the present modification, it is possible to further optimize (speed up) the time division process of detection of the finger 3 and the detection process of the stylus 2 in response to the type of a detection object of each of the first integrated circuit 120 and the second integrated circuit 220 in addition to the advantageous effect described above.

It is to be noted that the IC connection line 130 may be connected, in addition to direct connection of the first integrated circuit 120 and the second integrated circuit 220, to the host processor 40 and, in the case where there exists a controller for controlling the second housing 20, to the controller or the like. Further, the notification may be such as allows High or Low of the voltage level to pass through or may be transferred as a predetermined data signal on a communication protocol.

Further, although the system that uses two integrated circuits of the first integrated circuit 120 and the second integrated circuit 220 is described as an example of the sensor system 50, also it is possible to apply the system to a system including a third integrated circuit and a fourth integrated circuit in an electronic apparatus that includes three or more panel faces including a third housing, a fourth housing and so forth. In this case, by issuing, when one certain integrated circuit detects the stylus 2, a notification of the detection of the stylus 2 to all of the other integrated circuits, interference between uplink signals US can be prevented similarly as in the embodiment described above.

While the preferred embodiment of the present disclosure has been described, the present disclosure is not limited to the embodiment at all, and it is a matter of course that the present disclosure can be carried out in various manners without departing from the subject matter thereof.

REFERENCE NUMBERS

FIG. 4
- 711: Acquisition of detection state of the other integrated circuit
- 712: Detected state?
- Detected
- Not detected
- 713: Transmission of uplink signal
- 714: Downlink signal detected?
- 715: Notify the other integrated circuit of "detected" through IC connection line
- 716: Derivation and outputting of pen position
- 720: Detection of finger FIG. 10
- 711: Acquisition of detection state of the other integrated circuit
- 1012: Detected state and positional relationship?
- Detected and predetermined positional relationship
- Not detected
- 713: Transmission of uplink signal
- 714: Downlink signal detected?
- 715: Notify the other integrated circuit of "detected" through IC connection line
- 716: Derivation and outputting of pen position
- 720: Detection of finger FIG. 11
- 713: Transmission of uplink signal
- 720: Detection of finger
- 714 YES 715: Detection and notification of downlink signal
- 714 NO: Downlink signal not detected
- 1120: Repeated process of finger detection 720

What is claimed is:

1. A sensor system that detects a stylus and is provided in an electronic apparatus, the sensor system comprising:
a first integrated circuit connected to a first sensor electrode group, wherein the first integrated circuit, in operation, performs a detection process that detects a position of the stylus on a panel face of a first housing and outputs the position of the stylus on the panel face of the first housing to a host controller via a first output line; and
a second integrated circuit connected to a second sensor electrode group, wherein the second integrated circuit is different from the first integrated circuit, wherein the second integrated circuit, in operation, performs a detection process that detects a position of the stylus on a panel face of a second housing and outputs the position of the stylus on the panel face of the second housing to the host controller via a second output line that is different from the first output line, and performs a detection process that detects a position of a finger on the panel face of the second housing and outputs the position of the finger on the panel face of the second housing to the host controller via the second output line,
wherein, in response to the first integrated circuit determining that the first integrated circuit has detected a presence of the stylus the first integrated circuit issues to the second integrated circuit a notification indicating that the first integrated circuit has detected the presence of the stylus,
wherein the first integrated circuit directly issues the notification to the second integrated circuit via a connection line that connects the first integrated circuit to the second integrated circuit,
wherein the connection line is different from the first output line and the second output line,
wherein, in response to receiving from the first integrated circuit the notification indicating that the first integrated circuit has detected the presence of the stylus, the second integrated circuit stops transmission of a second uplink signal through the second sensor electrode group while the first integrated circuit continues transmission of a first uplink signal through the first sensor electrode group, and
wherein, after the second integrated circuit stops transmission of the second uplink signal through the second sensor electrode group, the second integrated circuit performs the detection process that detects the position of the finger on the panel face of the second housing without performing the detection process that detects the position of the stylus on the panel face of the second housing.

2. The sensor system according to claim 1, wherein:
the first integrated circuit is fixed to the first housing;
the second integrated circuit is fixed to the second housing;
the first sensor electrode group and the first integrated circuit are connected to each other by a first routing line provided inside of the first housing;
the second sensor electrode group and the second integrated circuit are connected to each other by a second routing line inside of the second housing; and
at least part of the connection line is provided in a connector.

3. The sensor system according to claim 2, wherein:
the connector is a hinge that connects the second housing to the first housing such that the second housing is pivotally movable with respect to the first housing; and
the connection line is provided on a flexible board that is deformable by a turning motion of the hinge.

4. The sensor system according to claim 3, wherein:
the first routing line is bent or curved inside of the first housing fixedly at an angle independent of a turning angle of the hinge;
the second routing line is bent or curved inside of the second housing fixedly at an angle independent of the turning angle of the hinge; and
the connection line is bent or curved by turning movement of the hinge.

5. The sensor system according to claim 1, wherein:
when the stylus is not detected, the first uplink signal is transmitted through the first sensor electrode group and the second uplink signal is transmitted through second sensor electrode group,
when a downlink signal by which the stylus is detected that is transmitted from the stylus is detected by the first sensor electrode group, the transmission of the first uplink signal through the first sensor electrode group is continued while transmission of the second uplink signal through the second sensor electrode group is stopped, and,
when the downlink signal by which the stylus is detected that is transmitted from the stylus is detected by the second sensor electrode group, the transmission of the second uplink signal through the second sensor electrode group is continued while transmission of the first uplink signal through the first sensor electrode group is stopped.

6. The sensor system according to claim 1, wherein:
after the transmission of the second uplink signal through the second sensor electrode group is stopped, when a downlink signal transmitted from the stylus is no longer detected, the transmission of the second uplink signal through the second sensor electrode group is resumed, and
after the transmission of the first uplink signal through the first sensor electrode group is stopped, when the downlink signal transmitted from the stylus is no longer detected, the transmission of the first uplink signal through the first sensor electrode group is resumed.

7. The sensor system according to claim 1, wherein:
the first integrated circuit and the second integrated circuit perform operations for detecting the stylus independently of each other by transmitting the first uplink signal and the second uplink signal asynchronously.

8. The sensor system according to claim 1, wherein:
the first uplink signal transmitted through the first sensor electrode group and the second uplink signal transmitted through the second sensor electrode group have a same waveform; and
the first uplink signal transmitted through the first sensor electrode group and the second uplink signal transmitted through the second sensor electrode group are indistinguishable by the sensor system.

9. The sensor system according to claim 1, wherein:
when a downlink signal transmitted from the stylus is detected by the first sensor electrode group and the first housing and the second housing have a given positional relationship to each other, the transmission of the second uplink signal through the second sensor electrode group is stopped, and
when the downlink signal transmitted from the stylus is detected by the second sensor electrode group and the first housing and the second housing have the given positional relationship to each other, the transmission of the first uplink signal through the first sensor electrode group is stopped.

10. The sensor system according to claim 1, wherein:
the second integrated circuit repeatedly performs the detection process that detects the position of the finger on the panel face of the second housing while the second integrated circuit receives the notification.

11. A method of detecting a stylus by a sensor system provided in an electronic apparatus, which includes a first housing, a second housing, a connector that connects the first housing and the second housing to each other, and a host processor, the method comprising:
performing, by a first integrated circuit connected to a first sensor electrode group, a detection process that detects a position of the stylus on a panel face of the first housing;
outputting, by the first integrated circuit connected to the first sensor electrode group, the position of the stylus on the panel face of the first housing to a host controller via a first output line;
performing, by a second integrated circuit connected to a second sensor electrode group, a detection process that detects a position of the stylus on a panel face of the second housing wherein the second integrated circuit is different from the first integrated circuit;
outputting, by the second integrated circuit connected to the second sensor electrode group, the position of the stylus to the host controller via a second output line that is different from the first output line;
performing, by the second integrated circuit connected to the second sensor electrode group, a detection process that detects a position of a finger on the panel face of the second housing;
outputting, by the second integrated circuit connected to the second sensor electrode group, the position of the finger on the panel face of the second housing to the host controller via the second output line;
in response to the first integrated circuit determining that the first integrated circuit has detected the position of the stylus on the panel face of the first housing, issuing, by the first integrated circuit, to the second integrated circuit, a notification indicating that the first integrated circuit has detected a presence of the stylus, wherein the first integrated circuit directly issues the notification to the second integrated circuit via a connection line that connects the first integrated circuit to the second integrated circuit, wherein the connection line is different from the first output line and the second output line; and
in response to receiving from the first integrated circuit the notification indicating that the first integrated circuit has detected the presence of the stylus, stopping transmission of a second uplink signal by the second integrated circuit while the first integrated circuit continues transmission of a first uplink signal through the first sensor electrode group,
wherein, after the transmission of the second uplink signal by the second integrated circuit is stopped, the second integrated circuit performs the detection process that detects the position of the finger on the panel face of the second housing without performing the detection process that detects the position of the stylus on the panel face of the second housing.

12. The method according to claim 11, wherein:
the first integrated circuit is fixed to the first housing;
the second integrated circuit is fixed to the second housing;
the first sensor electrode group and the first integrated circuit are connected to each other by a first routing line provided inside of the first housing; and
the second sensor electrode group and the second integrated circuit are connected to each other by a second routing line inside of the second housing.

13. The method according to claim 12, wherein:
the connector is a hinge that connects the second housing to the first housing such that the second housing is pivotally movable with respect to the first housing.

14. The method according to claim 13, wherein:
the first routing line is bent or curved inside of the first housing fixedly at an angle independent of a turning angle of the hinge; and
the second routing line is bent or curved inside of the second housing fixedly at an angle independent of the turning angle of the hinge.

15. The method according to claim 11, further comprising:
when the stylus is not detected, transmitting, by the sensor system, the first uplink signal through the first sensor electrode group and transmitting, by the sensor system, the second uplink signal through the second sensor electrode group;
when a downlink signal by which the stylus is detected that is transmitted from the stylus is detected by the first sensor electrode group, continuing the transmitting of the first uplink signal through the first sensor electrode group while stopping the transmitting of the second uplink signal through the second sensor electrode group; and
when the downlink signal by which the stylus is detected that is transmitted from the stylus is detected by the second sensor electrode group, continuing the transmitting of the second uplink signal through the second sensor electrode group while stopping the transmitting of the first uplink signal through the first sensor electrode group.

16. The method according to claim 11, further comprising:
after the second integrated circuit stops transmission of the second uplink signal through the second sensor electrode group, when a downlink signal transmitted from the stylus is no longer detected, transmitting, by the second integrated circuit, the second uplink signal through the second sensor electrode group;
after the first integrated circuit stops transmission of the first uplink signal through the first sensor electrode group, when the downlink signal transmitted from the stylus is no longer detected, transmitting, by the first integrated circuit, the first uplink signal through the first sensor electrode group.

17. The method according to claim 11, wherein:
the first integrated circuit and the second integrated circuit perform operations for detecting the stylus independently of each other by transmitting the first uplink signal and the second uplink signal asynchronously.

18. The method according to claim 11, wherein:
the first uplink signal transmitted through the first sensor electrode group and the second uplink signal transmitted through the second sensor electrode group have a same waveform; and
the first uplink signal transmitted through the first sensor electrode group and the second uplink signal transmitted through the second sensor electrode group are indistinguishable by the sensor system.

19. The method according to claim 11, further comprising:
when a downlink signal transmitted from the stylus is detected by the first sensor electrode group and the first housing and the second housing have a given positional relationship to each other, stopping the transmission of the second uplink signal through the second sensor electrode group, and
when the downlink signal transmitted from the stylus is detected by the second sensor electrode group and the first housing and the second housing have the given positional relationship to each other, stopping transmission of the first uplink signal through the first sensor electrode group.

20. The method according to claim 11, further comprising:
repeatedly performing, the second integrated circuit, the detection process that detects the position of the finger on the panel face of the second housing while the second integrated circuit receives the notification.

21. A sensor system that detects a stylus, the sensor system comprising:
a first integrated circuit connected to a first sensor electrode group disposed over a first panel face, wherein the first integrated circuit, in operation, transmits a first uplink signal through the first sensor electrode group and outputs a position of the stylus on the first panel face to a host controller via a first output line; and
a second integrated circuit connected to a second sensor electrode group disposed over a second panel face, wherein the second integrated circuit is different from the first integrated circuit, and wherein the second integrated circuit, in operation, transmits a second uplink signal through the second sensor electrode group and outputs a position of the stylus on the second panel face to the host controller via a second output line that is different from the first output line,
wherein the first panel face is movable with respect to the second panel face such that an angle between the first panel face and the second panel face changes,
wherein the first integrated circuit, in operation, issues to the second integrated circuit a notification indicating that the first integrated circuit has detected the stylus in response to the first integrated circuit determining that the first integrated circuit has detected the stylus,
wherein the first integrated circuit, in operation, directly issues the notification to the second integrated circuit via a connection line that connects the first integrated circuit to the second integrated circuit,
wherein the connection line is different from the first output line and the second output line,
wherein the second integrated circuit, in operation, stops transmission of the second uplink signal in response to receiving from the first integrated circuit the notification indicating that the first integrated circuit has detected the stylus while the first integrated circuit continues transmission of the first uplink signal, and
wherein, after the second integrated circuit stops transmission of the second uplink signal through the second sensor electrode group, the second integrated circuit, in operation, performs a detection process that detects a position of a finger on the second panel face without performing a detection process that detects a position of a stylus on the second panel face.

22. The sensor system according to claim 21, wherein:
the second integrated circuit repeatedly performs the detection process that detects the position of the finger on the second panel face while the second integrated circuit receives the notification.

* * * * *